United States Patent [19]

Durell et al.

[11] Patent Number: 4,922,859
[45] Date of Patent: May 8, 1990

[54] LIQUID DISPENSING ANIMAL GROOMING DEVICE

[75] Inventors: Joseph M. Durell, Hillsborough; Don W. Leathers, Durham, both of N.C.

[73] Assignee: Specialty Pet Products, Inc., Durham, N.C.

[21] Appl. No.: 177,972

[22] Filed: Apr. 5, 1988

[51] Int. Cl.$^5$ ............................................. A01K 13/00
[52] U.S. Cl. ......................................... 119/83; 119/85; 132/114; 401/139
[58] Field of Search ............... 119/83, 85, 86, 156, 119/159; 132/112, 113, 114; 401/139, 150, 149

[56] References Cited

U.S. PATENT DOCUMENTS

| | | | |
|---|---|---|---|
| 798,407 | 8/1905 | Frost | 132/114 |
| 2,660,251 | 11/1953 | Birosh | 119/86 |
| 2,922,425 | 1/1960 | Lerner et al. | 401/139 X |
| 2,943,602 | 7/1960 | Rundle | 119/156 |
| 3,118,166 | 1/1964 | Bell | 401/150 |
| 3,267,903 | 8/1966 | Valentine | 119/83 |
| 3,462,231 | 8/1969 | Pomares | 401/149 X |
| 3,603,694 | 9/1971 | Hamm | 40/150 |
| 3,648,696 | 3/1972 | Keith | 119/1 X |
| 3,961,635 | 6/1976 | Miya | 132/113 X |
| 4,044,724 | 8/1977 | Merchill | 119/83 |

FOREIGN PATENT DOCUMENTS

| | | | |
|---|---|---|---|
| 1121877 | 1/1962 | Fed. Rep. of Germany | 119/159 |
| 190353 | 5/1937 | Switzerland | 119/86 |

OTHER PUBLICATIONS

Small Garden Sprayer Facilitates Treating Range Cattle for Ear Ticks, N. G. Cobbett, D.V.M. reprinted from Aug. 1953, The Cattleman.

Primary Examiner—John Weiss
Attorney, Agent, or Firm—Bell, Seltzer, Park & Gibson

[57] ABSTRACT

A liquid dispensing head of the device is so connected to the pump assembly of the device as to be capable of rotative and translatory movement to different adjustive positions that are respectively suited for grooming different areas of an animal, and that allow the pump assembly and the liquid supply container of the device to be maintained substantially upright during the grooming operation. The pump assembly is actuated by a trigger pivotally movable by a finger of the user.

10 Claims, 2 Drawing Sheets

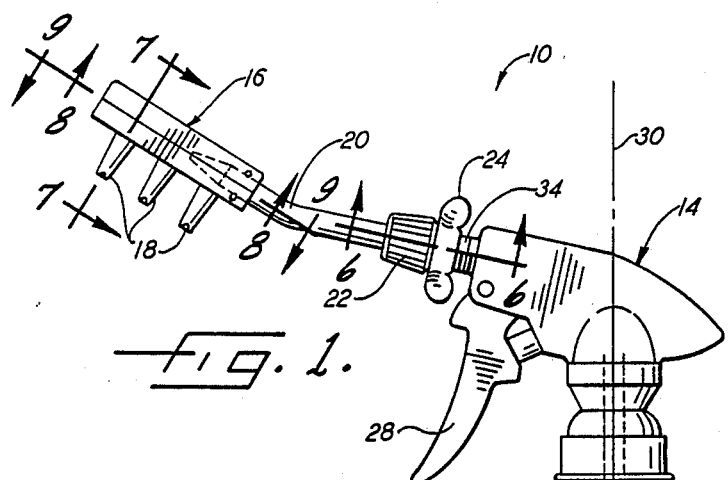
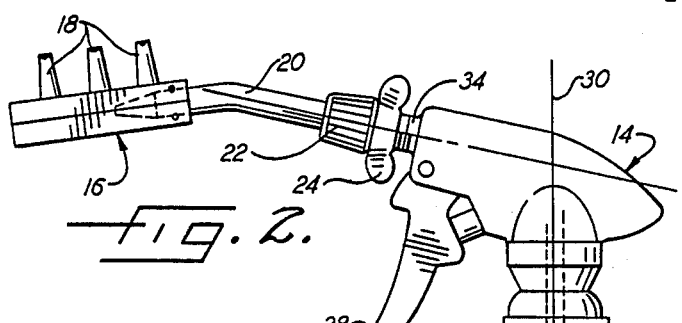
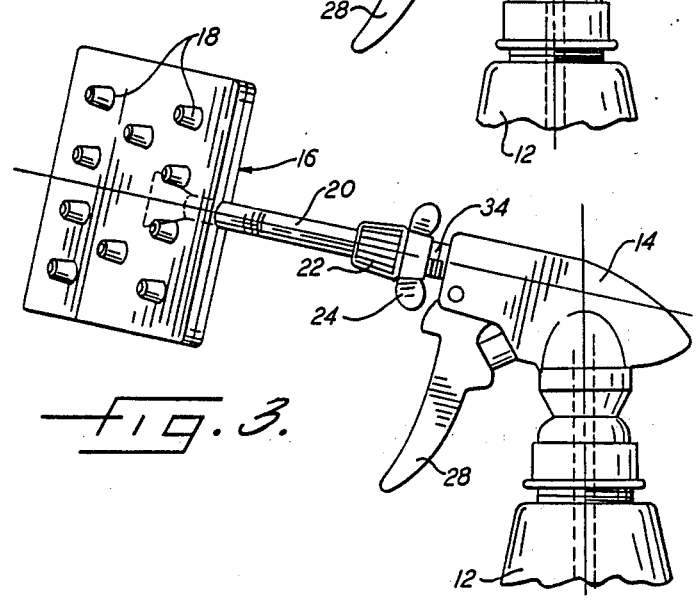
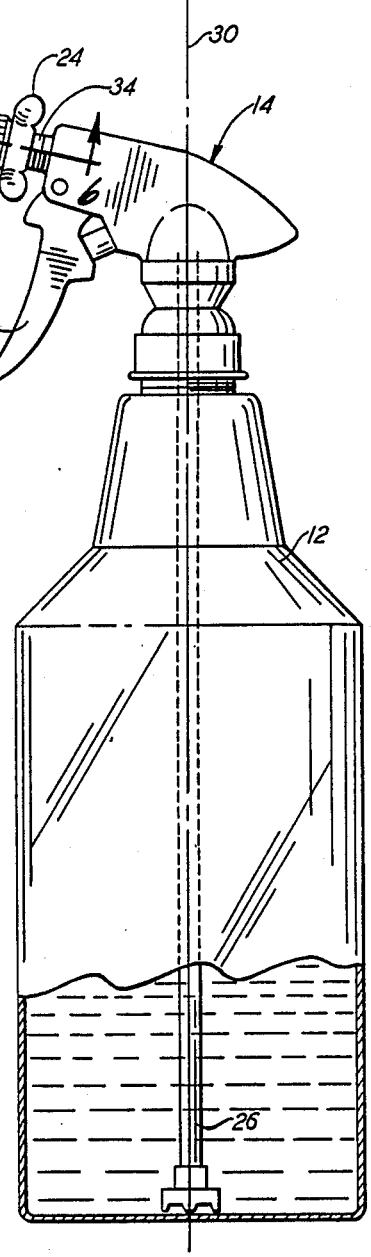
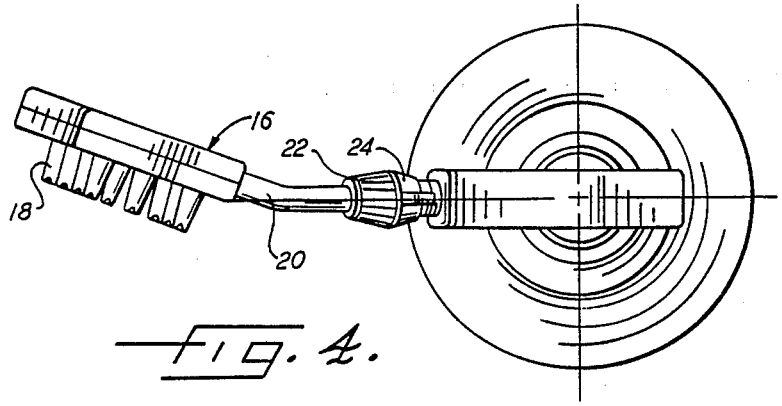
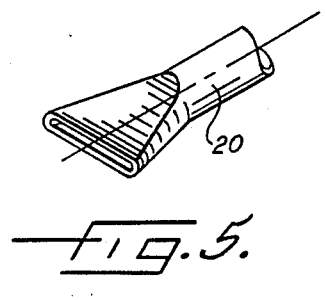

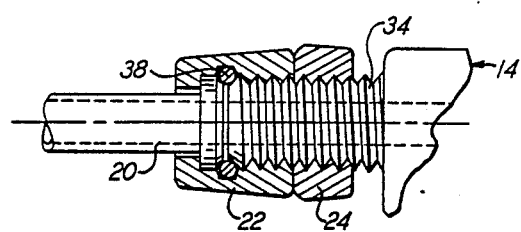
fig. 6.
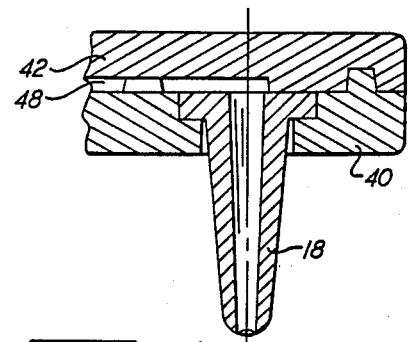
fig. 7.
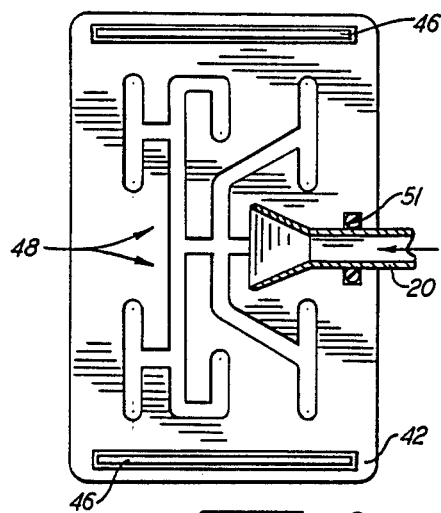
fig. 8.
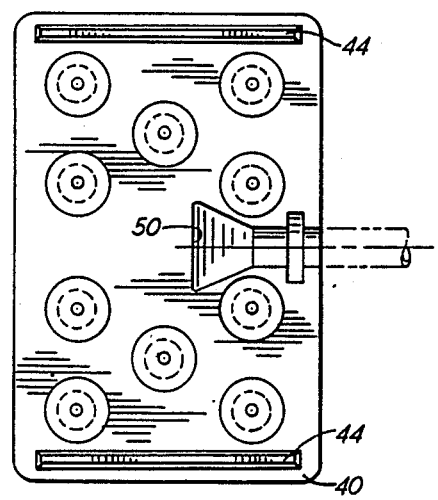
fig. 9.
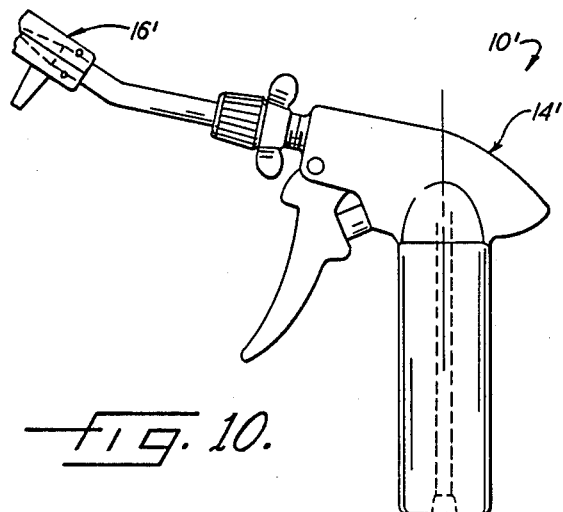
fig. 10.
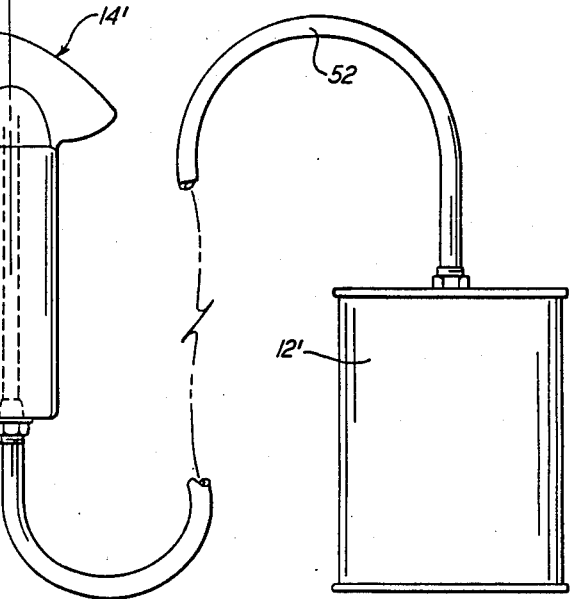

4,922,859

LIQUID DISPENSING ANIMAL GROOMING DEVICE

FIELD OF THE INVENTION

This invention relates to liquid-dispensing grooming devices of the type including a comb or brush-like applicator head having a plurality of hollow teeth, for applying shampoo, insecticide, medicine or other liquid substances to dogs, cats and other hairy animals.

BACKGROUND OF THE INVENTION

Animal grooming devices of the aforesaid general type have heretofore been proposed: see, e.g., U.S. Pat. Nos. 4,495,958, 4,183,328, 3,457,928 and 2,794,443. An advantageous feature of such devices is that they apply liquid directly upon the skin of the animal undergoing grooming or treatment, rather than merely upon the outer surface of the coat (which may be quite dense) of the animal.

An undesirable aspect of many of the previously proposed devices is the variability of the rate at which they discharge the liquids. The flow rate of those devices that utilize gravity feed of the liquid from a container or similar source to the toothed applicator head changes upon changes in the level of the liquid within the supply source. The liquid level in the supply source will of course drop as liquid is discharged therefrom, and may also change due to changes in the orientation of the applicator head and liquid source, which are usually fixedly connected to each other. Inversion or substantial inclination of the devices may result in complete cessation of the fluid flow therefrom. Similar deficiencies are inherent in devices that employ a flexible bottle or similar liquid source that is squeezed to force liquid to the toothed applicator head. The amount of liquid discharged from the bottle by a squeeze of any specific amount will vary with the ever-changing quantity of liquid then present within the bottle, and may also vary with changes in the bottle's orientation. Another disadvantage of those devices that employ a squeeze bottle integral with the applicator head is that they will in certain orientations discharge fluid even when none is desired and the bottle is not being squeezed.

While not of the hollow-tooth type, U.S. Pat. No. 4,254,738 discloses an animal grooming device wherein desired liquid is positively pumped to the applicator head, from a supply container integral with such head, by manual operation of a linearly-movable pump operator member. In various operating orientations of the device the pump mechanism would provide the desired greater degree of control over the fluid discharge rate. However, if the device were used in an inverted or downwardly inclined orientation, at a time when its liquid supply container was less than completely full, no fluid would be discharged upon actuation of the pump operator element. Such an orientation of the grooming device would appear to be necessary if all major surface areas of an animal are to be properly groomed or treated.

With the foregoing in mind, a primary object of the present invention is the provision of an improved liquid-dispensing grooming device, of the pump-actuated type, by which a desired amount of treatment or grooming liquid may be applied substantially uniformly to any and all surfaces of an animal undergoing treatment, and in which the required pumping action can be and is conveniently and easily producible for a considerable period of time by a finger of the user of the device.

A related and more specific object is the provision of a grooming device of the type in question that can be used to treat or groom substantially any surface areas of an animal without inversion or large magnitude inclination of either the pump or the liquid supply container of the device.

SUMMARY OF THE INVENTION

The grooming device of the present invention includes a comb or brush-like applicator head having fluid passageway means therein, and having a plurality of hollow tooth-like elements projecting therefrom and communicating with such passageways. A finger-operated pump assembly, which preferably is of the pivoted "trigger" type, pumps liquid from a thereto connected bottle or other suitable liquid supply source upon user actuation of the trigger. Eccentric tubular connecting means connects the applicator head to the pump assembly for passage of the pumped liquid to the head, and for rotative and translatory adjustive movement of the head between a plurality of different possible positions of the head relative to the pump assembly. The aforesaid positions include one particularly suitable for grooming of the back or other upper surface areas of an animal, another particularly suitable for grooming of the stomach and other undersurface areas of the animal, and another particularly suited for grooming the sides or other vertical surface areas of the animal. The device further includes retaining means, preferably of a type employing readily engageable and disengageable threaded elements, for releasably retaining the applicator head in any desired one of its possible positions.

In one embodiment of the invention the pump assembly and the liquid supply source are connected directly to one another, while in another embodiment the foregoing components are spaced from each other and are interconnected by flexible tubing that conducts liquid from the supply source to the pump mechanism upon actuation of the latter. In each embodiment the pump assembly and the liquid supply source remain substantially upright during use of the applicator.

BRIEF DESCRIPTION OF THE DRAWINGS

Other features of the invention will be apparent from the following description of illustrative embodiments thereof, in which:

FIG. 1 is a side elevational view of a grooming device in accordance with the invention, the liquid supply bottle of the device being partially broken away to reveal interior detail;

FIG. 2 is a fragmentary side elevational view of the upper portion of the device, showing the applicator head and its supporting tubular member in a different adjustive position;

FIG. 3 is a side elevational view similar to FIG. 2 showing the applicator head and its supporting tubular member in still another adjustive position;

FIG. 4 is a top plan view looking in the direction of the arrows 4—4 of FIG. 3;

FIG. 5 is an enlarged fragmentary perspective view of the outer end portion of the head supporting tubular member;

FIG. 6 is an enlarged fragmentary sectional view, taken substantially along the line 6—6 of FIG. 1, of the connection between the inner end of the head supporting tubular member and the outlet of the pump assembly of the device;

FIG. 7 is an enlarged fragmentary sectional view of part of the applicator head;

FIG. 8 is a partially sectional plan view, taken substantially along the line 8—8 of FIG. 1, of the inner major face of a member forming part of the applicator head, and of part of the head supporting tubular member;

FIG. 9 is a plan view taken substantially along the line 9—9 of FIG. 1, of another member forming part of the applicator head; and FIG. 10 is a partially foreshortened elevational view of another embodiment in which the pump and liquid source components of the grooming device are spaced from each other and interconnected by a flexible conduit.

DESCRIPTION OF THE ILLUSTRATED EMBODIMENTS

The grooming device 10 shown in FIG. 1 generally includes a bottle or similar liquid source 12; a manually-operable pump assembly 14, a brush or comb-like applicator head 16 having a plurality of tubular or hollow tooth elements 18 extending from one major face thereof; eccentric means connecting head 16 to pump assembly 14 for rotative and translational adjustive movement of head 16 relative to pump assembly 14 and bottle 12, such means illustratively including a rigid member 20; and releasable retaining means, illustratively including an internally threaded fitting 22 and lock nut 24, for releasably retaining head 16 in any desired one of its adjustive positions.

Liquid supply bottle 12 may be and illustratively is of a conventional type formed of plastic or similar material and having an externally threaded neck at its upper end. Except for the construction of its liquid outlet, pump assembly 14 also may be and illustratively is of a known construction that is releasably screwed onto the threaded neck of bottle 12. Pump assembly 14 has a depending flexible liquid inlet tube 26 that extends into, and has a liquid inlet opening adjacent the bottom of, the bottle. The actuating element of pump 14 preferably consists of a trigger-like element 28 that is pivotally movable in a rearward direction by a finger of the user of the pump, and that is returned forwardly by suitable spring means (not shown) associated therewith. When maintained during use in its illustrated upright position, or one in which its central axis 30 is not greatly inclined relative to the vertical, a pump assembly 14 of the illustrated type can be operated conveniently by a user of a device 10 without undue effort, fatigue or leakage. Additionally, substantially the same amount of liquid will be discharged from the pump upon each actuation of trigger element 28. Not all of the foregoing benefits would be realized if pump 14 and bottle 12 were inverted or severely inclined during use of device 10.

Liquid withdrawn via tube 25 from bottle 12 by pump 14 is discharged from it via a tubular pump outlet member 34 best shown in FIG. 6. Member 34 is externally threaded, and receives the internally threaded annular fitting 22 that encircles the flanged inner end section of the rigid tubular member 20 extending to applicator head 16. Tightening of fitting 22 urges the inner end of member 20 into firm engagement with pump discharge member 34, such that the former receives the liquid discharged from the latter. An O-ring 38 or similar sealing means may be and illustratively is provided to prevent leakage from fitting 22. Pump discharge member 34 is also encircled by and threadably mated with a lock nut 24 which preferably is of the "winged" type that may be easily tightened or loosened. When rotated in the appropriate direction, nut 24 engages fitting 22 and prevents the same from inadvertently becoming loosened to such an extent as might permit undesired rotation of the inner end portion of tubular member 20 about its central axis.

Tubular member 20 is of eccentric non-linear shape, having an outer end section that extends angularly relative to its inner end section. The angle between the aforesaid portions of member 20 may be and illustratively is within the range of approximately 15°–20°.

Referring now also to FIGS. 7–9 of the drawings, applicator head 16 includes body members 40, 42 that are secured to each other by mating tongue and groove elements 44, 46 and by suitable adhesive or fasteners (not shown). The tubular tooth elements 20 of head 16 are carried by and project outwardly from the outer major surface of one of the head body members, illustratively member 40. As is indicated in FIG. 7, each tooth element 18 preferably is of tapered configuration, and its interior passageway or bore may also be tapered. While the tooth elements 18 may be and illustratively are of a type formed separately from head member 40, they might instead be formed integrally therewith. Each tooth 18 preferably has a length sufficient for the same to penetrate through the coat and to the skin of the animal undergoing treatment or grooming. Grooming or treatment liquid is conducted to tooth elements 18 by groove-like passageways 48 provided within the inner face of one of the head body members, illustratively body member 42, that communicate therewith. Passageways 48 also communicate, at their upstream ends, with a recess 50, provided within one or both of body members 40, 42, having a shape complementary to the generally triangular shape, also shown in FIG. 5, of the partially flattened terminal portion of the section of the tubular member 20 disposed within head 16. The triangular flattened configuration of the terminal outer end portion of member 20, and the complementary shape of the recess 50, prevents relative rotative and other axial movement between applicator head 16 and tubular member 20 once the two body members 40, 42 of head 16 have been secured together. The relative sizes of passageways 48, and/or of the passageways within tooth elements 18 with which such passageways communicate, is preferably such that the amount of liquid conducted to and discharged from each element 18, upon actuation of pump assembly 14, is substantially the same. As is indicated in FIG. 8, a sealing ring 51 encircles the section of tubular member 20 within head 16 to prevent leakage.

After slightly loosening lock nut 24, and if necessary fitting 22, a user of applicator 10 may readily effect rotation of the inner section of rigid tubular member 20 about its central axis and the therewith aligned axis of pump discharge member 34. Due to the angular eccentric shape of member 20, this effects simultaneous rotative and translatory movement of head 16 to any desired one of myriad possible adjustive positions thereof, which include those illustrated in FIGS. 1–4 of the drawings. In the FIG. 1 position thereof, head 16 extends at an acute angle (illustratively about 30°) relative to the horizontal, and its tooth elements 18 project angularly forwardly and downwardly. This adjustive position is particularly advantageous for grooming or treating the back and other uppermost surface areas of an animal, during which treatment the pump mechanism and bottle may be maintained upright, or tilted slightly in a counterclockwise direction (as viewed in FIG. 1). The FIG. 2 adjustive position of head 16 ensues when tubular member 20 is rotated (in either desired direction) 180° about the central axis of its inner section. In the FIG. 2 position of head 16, its tooth elements 18 extend upwardly and slightly outward at a much smaller angle relative to the horizontal, when the central axis of bottle 12 and pump assembly 14 is vertical. This permits the stomach and other undersurface areas of the animal to be treated easily and without major displacement of bottle 12 and pump 14 from a substantially upright orientation. FIGS. 3 and 4 show head 16 in still another adjustive position, achievable by 90° rotation of the inner section of tubular member 20 from either its FIG. 1 or its FIG. 2 position. When head 16 occupies its FIGS. 3 and 4 position, tooth elements 18 extend generally horizontally and the projection of a plane containing the outer ends of the tooth elements is spaced laterally from the central axis 30 of pump assembly 14 and is approximately tangent to the side of bottle 12. This position of the applicator head permits convenient grooming of the side and other generally vertically extending areas of the animal, again without significant inclination of bottle 12 and pump 14.

In addition to the positions thereof shown in FIGS. 1-4, head 16 may of course be placed in any desired position intermediate those shown. Once placed in its desired adjustive position, head 16 is retained therein by retightening of fitting 22 and lock nut 24.

FIG. 10 of the drawings shows an alternative grooming device 10' in which pump assembly 14' and the liquid supply bottle or tank 12' are spaced from each other and connected by flexible tubing 52 which extends to and into a pump handle 54, illustratively of the "pistol-grip" type, provided upon pump assembly 14'. The remaining components of the device 10' shown in FIG. 9 may be the same as in the previously discussed device 10. Applicator 10' might be preferred in, for instance, a kennel or other location where numerous animals undergo frequent treatment or grooming, and where the treatment or grooming liquid is purchased in large quantities. In such a utilization, a single tank or other liquid supply store 12' might be used to supply liquid to a plurality of pump mechanisms and associated applicator heads.

While specific embodiments of the invention have been shown and described, this was for purposes of illustration only, and not for purposes of limitation, the scope of the invention being in accordance with the following claims.

We claim:

1. A device for applying liquid to animal pets and the like, comprising:
    a bottle-like liquid container having an elongate generally vertically extending central axis, said container being adapted to be conveniently grasped and transported by one hand of a user of said device;
    pump means connected to said container for conducting liquid from said container upon manual operation of said pump means by the user of said device;
    a liquid applying head spaced laterally from said axis of said container, said head including a main body having liquid passageway means therein, and a plurality of hollow tooth-like elements projecting from said head and communicating with said passageway means;
    rigid eccentric tubular means supportively connecting said head to said pump means for conducting to said head liquid conducted from said container by said pump means, and for permitting adjustive rotative and translational movement of said head between a plurality of different adjustive positions relative to said generally vertically extending central axis of said container, said positions including a first position wherein said tooth-like elements of said head extend upwardly in generally vertical parallel relationship to said axis of said container, and a second position wherein said tooth-like elements of said head extend in generally horizontal perpendicular relationship to said axis of said container.

2. A device as in claim 1, wherein said tooth-like elements have liquid discharging openings within and centrally of the outer ends thereof.

3. A device as in claim 1, wherein said rigid tubular eccentric means connects said head to said container for rotative movement of said head through 360°.

4. A device as in claim 1, wherein said adjustive positions of said head include a third position wherein said tooth-like elements of said head extend downwardly in generally vertical parallel relationship to said axis of said container.

5. A device as in claim 1, wherein said pump means includes a pivotally movable trigger-like actuating element and a liquid discharge member.

6. A device as in claim 5, wherein said rigid eccentric tubular means connecting said head to said pump means has first and second end sections extending in non-aligned angular relationship to each other, said first end section of said tubular means being fixedly connected to said head, and fitting means connecting said second end section of said tubular means to said discharge member of said pump means for adjustive rotative movement of said second end section about its central axis.

7. A device as in claim 1, and further including releasable means for releasably securing said head in any desired one of said adjustive positions thereof.

8. A device for applying liquid to animal pets and the like, comprising:
    an upstanding bottle-like liquid container of a size and shape adapted to be conveniently grasped and transported by a hand of a user of said device;
    pump means connected to the upper end of said container for pumping liquid therefrom, said pump means including a pivotally movable trigger-like element actuable by a finger of the user of said device;
    a liquid applying head spaced laterally from said container, said head including a main body having liquid passageway means therein, and a plurality of hollow tooth-like elements projecting from said head and communicating with said passageway means;
    rigid eccentric tubular means supportively connecting said head to said pump means for conducting to said head liquid pumped from said container by said pump means, and for adjustive rotative and translational movement of said head between a plurality of different adjustive positions relative to said container and wherein said tooth-like elements of said head can be applied to generally horizontal back and stomach portions and to opposite side portions of said animal pets while maintaining said container in a substantially upright position; and releasable means for releasably securing said head in any desired ones of said adjustive positions thereof.

9. A device as in claim 8, wherein said tooth-like elements have liquid discharging openings within and centrally of the outer ends thereof.

10. A device as in claim 8, wherein said rigid eccentric tubular means connects said head to said container for rotative movement of said head through 360°.

* * * * *